United States Patent
Geary

[15] 3,680,814
[45] Aug. 1, 1972

[54] AIRCRAFT

[72] Inventor: Milford Geary, Box 26, Polo, Ill. 61064

[22] Filed: Feb. 11, 1970

[21] Appl. No.: 10,331

[52] U.S. Cl..................................................244/13
[51] Int. Cl.................................................B64c 1/00
[58] Field of Search..............244/12, 13, 42, 35, 36

[56] References Cited

UNITED STATES PATENTS

| | | | |
|---|---|---|---|
| 3,202,383 | 8/1965 | Le Bel et al. | 244/42.41 |
| 1,857,964 | 5/1932 | Leonard | 244/42 CA |
| 2,365,205 | 12/1944 | Martin | 244/35 |
| 3,276,722 | 10/1966 | Eggers, Jr. et al. | 244/36 |

*Primary Examiner*—Milton Buchler
*Assistant Examiner*—Carl A. Rutledge

[57] ABSTRACT

An aircraft of reduced drag adapted for buoyancy upon the thrust stream of its engines. The aircraft having a forwardly disposed base having a generally horizontally disposed upper surface, first and second platforms arranged in stepped relationship to the base, a pair of upwardly and outwardly extended sides interconnecting the base and platforms; a first set of engines adapted to draw air from above the base and thrust the air rearwardly below the first platform; a second set of engines adapted to draw air from above the first platform and thrust the air rearwardly below the second platform, the aircraft being buoyantly supported on the thrust stream. Elevators are provided to direct the flow of thrust from the engines and a forwardly disposed retractable member pivotally connected to the base and disposed between the sides to occlude a direct flow of air into the first engines to effect a cavity reduction at the prow of the aircraft to facilitate rapid lift thereto. Conventional rudders and landing gear are also provided for obvious purposes.

8 Claims, 9 Drawing Figures

PATENTED AUG 1 1972
3,680,814
SHEET 1 OF 2
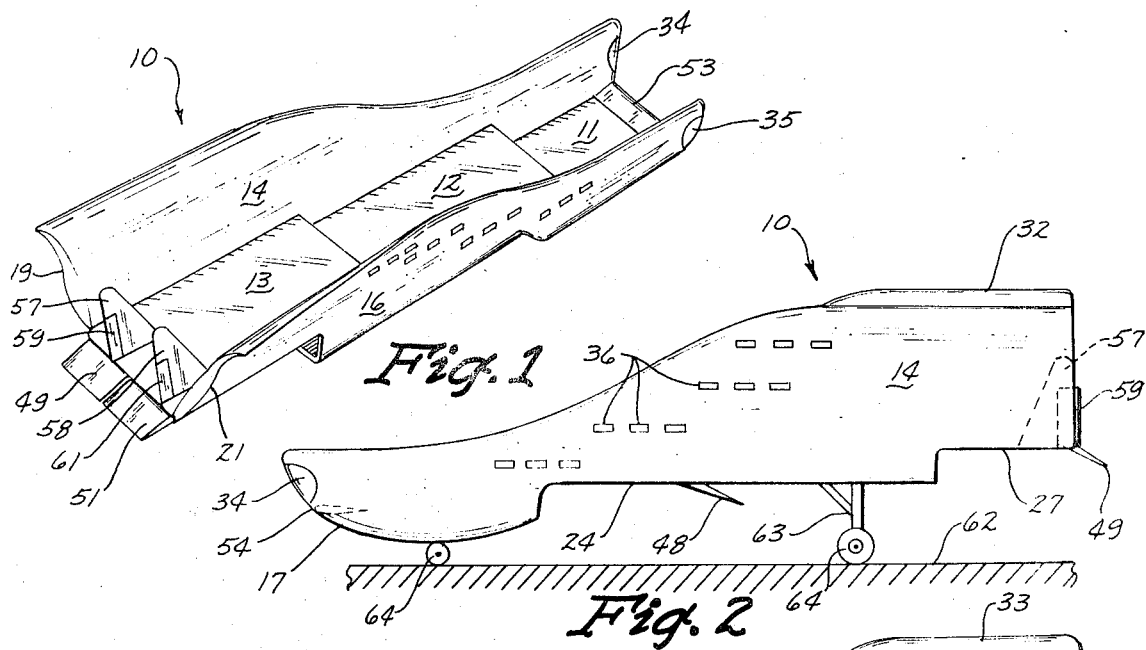
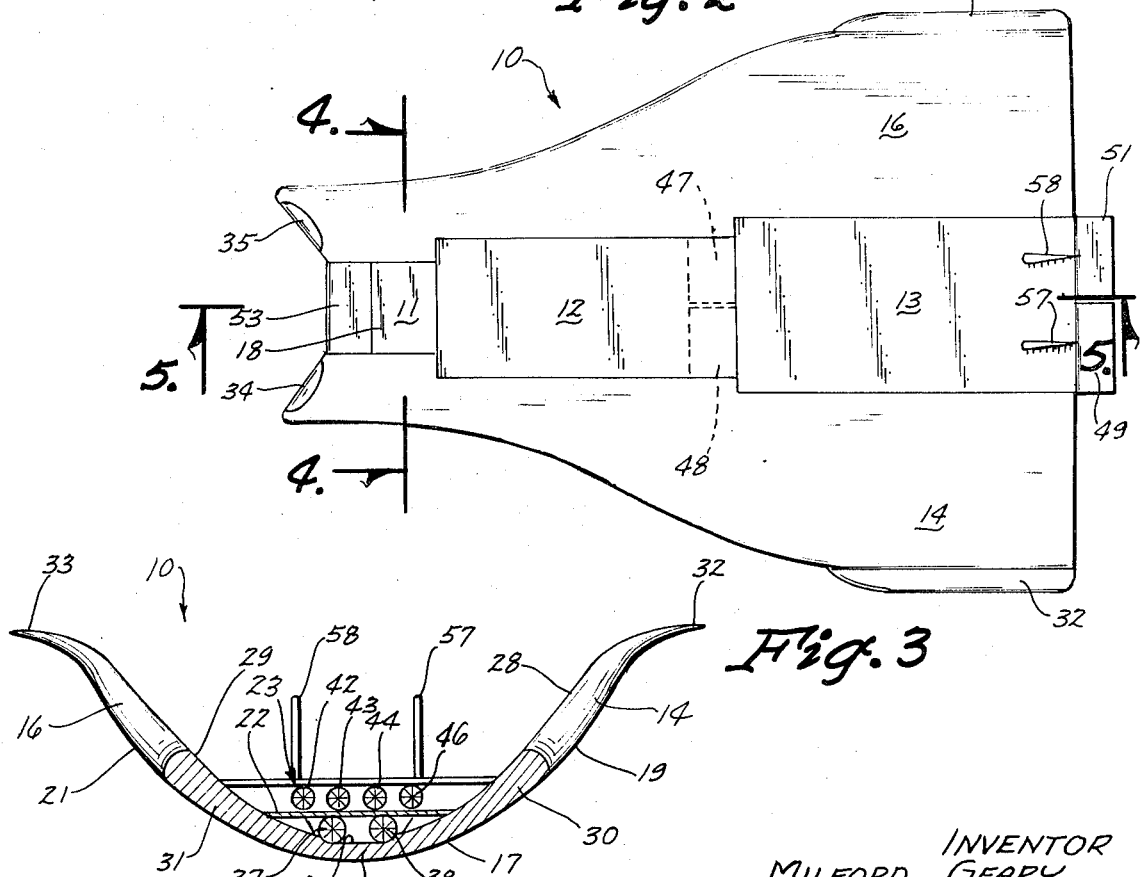
INVENTOR
MILFORD GEARY
BY
Henderson & Strom
ATTORNEYS

PATENTED AUG 1 1972 3,680,814

INVENTOR
MILFORD GEARY
BY
Henderson & Strom
ATTORNEYS

AIRCRAFT

BACKGROUND OF THE INVENTION

This invention relates generally to aircraft and particularly to a wingless aircraft adaptable for relatively slow as well as supersonic speeds.

The advent of jet aircraft has found necessary modification in the wings of the aircraft owing to the drag generally associated therewith. These modifications generally include a reduction in the wing height and an extension of the wings tangently rather then lateral to the fuselage to reduce the drag created by the wings. While these modifications have increased craft speeds and reduced fuel consumption, they have also created certain problems. Among these problems, the most common are inherent stall characteristics at reduced speeds and the need for longer runways to facilitate faster landings and increased takeoff speeds to affect the necessary lift to the larger aircraft.

The aircraft of this invention contemplates the removal of the conventional wings to reduce the drag created thereby and to take maximum advantage of heretofore dissipated qualities inherent in the conventional engines of the aircraft. The aircraft of this invention applies the great air induction qualities inherent in the engine to remove or to circulate the drag air above the aircraft surface and thereby reduce the downward pressure and drag commonly found to act on the upper surface of conventional aircraft. The engines likewise direct the air rearwardly in close proximity to the under surface or thrust beds of the aircraft to create a buoyancy for the craft upon the thrust stream. Means are provided to selectively direct the jet stream downwardly to enable a rapid ascent on takeoff and thereby provide an aircraft capable of a short takeoff.

A prow panel pivotally secured to and between the two sides of the craft can be raised to form a box-like cavity defined by the panel, two sides, first engine induction inlets and upper surface of the forward base. The strong air induction capability of the forward engines creates a semi-vacuum in the cavity to reduce the drag on the prow and cause a controlled lift thereof augmented by the engines suction of air from above the cavity.

In essence, the aerodynamics of the present aircraft is similar to the aerodynamics of the conventional jet aircraft since the conventional aircraft relies upon the fuselage for buoyancy and stability in flight. Once the conventional aircraft has reached its cruising altitude, the wings tend to increasingly cause added drag thereon resulting in a larger fuel consumption then the aircraft of the instant invention. Further, the wings are greatly affected and are primarily responsible for an aircrafts reaction to a down draft by their response to the air pressure changes causing the plane to stall or drop rapidly.

Employing the design of the instant application, the outer shape of the vehicle frame resembles that of a conventional fuselage and provides similar buoyancy and stability. The reduction of air from the upper surfaces of the craft and the directing of that air to the lower surfaces of the vehicle frame causes the craft to be more buoyant. The cavity reduction quality in the prow of the craft facilitates rapid lift of the prow for takeoff and anti-stall purposes in air pockets. Longitudinal fuselage flaps disposed on the lateral sides of the craft and retractable therein may be provided to enhance the roll stability of the craft, facilitate short landings, and provide flight stability in adverse weather conditions.

SUMMARY OF THE INVENTION

This invention relates to an aircraft comprising an elongated vehicle including a forwardly disposed base having a generally horizontally disposed upper surface, a first and second platform arranged in stepped relationship to the upper surface of the base, and a pair of upwardly and outwardly extended sides interconnecting the base and platform members; a first series of engines connected to the base and inducting air from the upper surface thereof and thrusting the air rearwardly under the first platform; a second series of engines connected to the first platform and inducting air from the upper surface thereof and thrusting the air rearwardly under the second platform; a pair of elevators pivotally connected to the first and second platforms to direct the thrust stream from the engines; a pivotal prow panel disposed between the two sides adjacent the base for lift control purposes; a rudder unit connected to the second platform for stability purposes and wheel units connected to the vehicle to provide support and maneuverability to the aircraft while on the ground.

It is an object of this invention to provide a novel aircraft.

It is another object of this invention to adapt the air induction characteristics inherent with a jet engine to a positive advantage in enhancing lift and reducing drag upon the craft.

It is yet another object of this invention to provide an aircraft having a cavity formed in its prow to reduce the normally downward pressure thereon and provide a lift therefor to reduce stalls and promote safety heretofore unobtainable with conventional winged craft.

It is still another object of this invention to provide an aircraft adaptable for supersonic speeds with high fuel efficiency by reducing the drag thereon, yet an aircraft that is safe at the relative slow speeds necessary for take-offs and landings.

It is a further object of this invention to provide an aircraft having twin fuselages.

It is an object of this invention to provide novel longitudinal fuselage flaps adapted to extend laterally from the sides of a craft to provide roll control to the craft and permit shorter take-offs and landings.

These objects and other features and advantages of the aircraft of this invention will become readily apparent upon reference to the following description when taken in conjunction with the accompanying drawings.

BRIEF DESCRIPTION OF THE DRAWINGS

FIG. 1 is a perspective view of the aircraft of this invention;

FIG. 2 is a side elevational view;

FIG. 3 is a plan view;

FIG. 4 is a cross-sectional view as taken along the line 4—4 of FIG. 3;

DESCRIPTION OF THE PREFERRED EMBODIMENT

Figure 5:
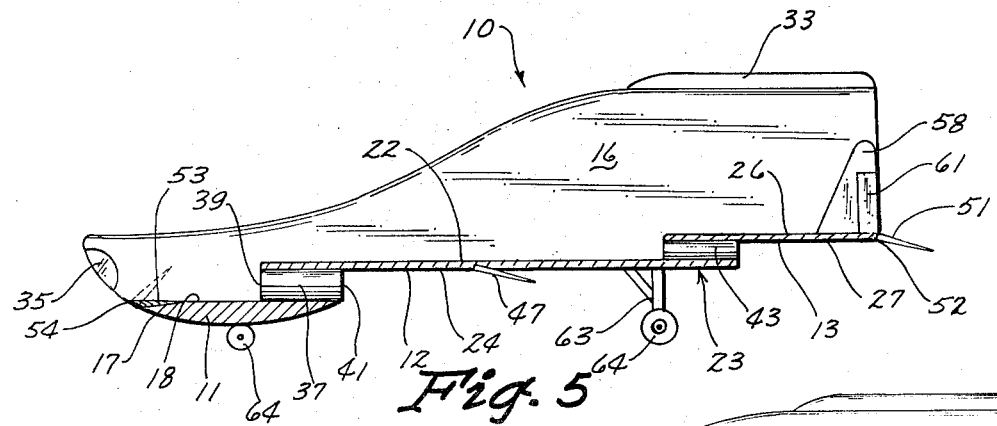
FIG. 5 is a cross-sectional view as taken along the line 5—5 of FIG. 3.

Referring now to the drawings and particularly to FIG. 1, the aircraft of this invention is indicated generally by the numeral 10. The aircraft 10 includes an elongated frame or vehicle defined by a base 11, a first platform 12, and a second platform 13 interconnected by a pair of spaced apart sides 14 and 16 extended the length of the aircraft 10. The base 11 and two platforms 12 and 13 are horizontally disposed and arranged in stepped relationship to each other.

The base 11 (FIGS. 1–5) forms the prow of the aircraft 10 and includes a curved lower surface 17 and a horizontally disposed upper surface 18. The lower surface 17 is coextensive with the outer walls 19 and 21 of the sides 14 and 16 respectively and form therewith an integrated surface. The base 11 may include a passage way (not shown) interconnecting the two sides 14 and 16.

The first platform 12 (FIG. 5) is disposed above the upper surface 18 of the base 11 and extends rearwardly thereof. The platform 12 includes an upper surface 22 forming an induction bed for the aft series of engines 23 as hereinafter described. The platform 12 likewise includes a lower surface 24 integral with the outer walls 19 and 21 of the sides 14 and 16 respectively.

The second platform 13 (FIG. 5) is disposed above and extends rearwardly of the first platform 12. The second platform 13 also includes an upper surface 26 and a lower surface 27, the latter surface 27 being integral with the outer walls 19 and 21 of the sides 14 and 16 respectively.

The sides 14 and 16, as best illustrated in FIG. 4, extend upwardly and outwardly from the base 11 and first and second platforms 12 and 13. The sides 14 and 16 include spaced apart inner and outer walls 28, 19 and 29, 21, respectively, forming compartments 30 and 31 (FIG. 4) therebetween. The compartments 30 and 31 serve as fuselages for the aircraft 10 and generally include forwardly disposed cockpits and rearwardly disposed passenger or freight cabins. In side view (FIG. 2) the sides 14 and 16 take on an ascending configuration as the sides 14 and 16 extend rearwardly. The sides 14 and 16 include a pair of oppositely disposed flanges 32 and 33 forming a stabilizer for the aircraft 10. The sides 14 and 16 further include forward windows 34 and 35 to provide visibility to the crew and a plurality of windows 36 are provided for passengers.

A first or fore series of engines 37 and 38 (FIGS. 4 and 5) are connected to the base 11, with the longitudinal axis of the engines 37 and 38 extending parallel to the longitudinal axis of the vehicle. Each engine 37 and 38 is identical, therefore only one engine 37 will be described. The engine 37 includes a forward inlet 39 for induction of air thereto and an outlet 41 or exhaust for thrusting the air therefrom. The engine 37 has a strong air induction force and induces air adjacent the upper surface 18 or induction bed of the base 11 into the engine 37 and thrusts the air rearwardly in a stream, extending substantially coaxially to the engine 37, immediately below the lower surface 24 of the first platform 12. The induction of the air adjacent the induction bed 18 of the base 11 removes the downwardly directed air pressure acting thereon to augment the lifting force acting upon the lower surface 17 of the base 11 to aerodynamically keep the base 11 or prow buoyant. The jet stream exiting the engine 37 reacts with the lower surface 24 of the first platform 12 to augment the suspension or buoyancy of the craft 10.

A second or aft series 23 (FIGS. 4 and 5) of engines 42, 43, 44 and 46 are disposed between the upper surface 22 of the first platform 12 and lower surface 27 of the second platform 13. The engines 42, 43, 44 and 46 are similar to engine 37 and therefore will not be further described. Suffice it to say that the engines 42, 43, 44 and 46 induce the air from the upper surface 22 or induction bed of the first platform 12, reducing downwardly directed pressure thereon, and discharge the air in a thrust stream rearwardly to react with the lower surface 27 of the second platform 13 to produce a buoyant effect thereon.

A first series of elevators 47 and 48 (FIGS. 2, 3 and 5) are pivotally connected to the lower surface 24 of the first platform 12 a selected distance from the outlets 41 of the engines 37 and 38. The elevators 47 and 48 are independently and selectively operable to pivot downwardly into the thrust stream and thereby direct the stream downwardly to augment the lift force of the aircraft 10. In flight, the elevators 47 and 48 are retracted into and extend rearwardly flush with the lower surface 24 of the first platform 12. Each elevator 47 and 48, may be selectively lowered independently to augment yaw control to the aircraft 10.

A second series of elevators 49 and 51 (FIGS. 1 and 3) are pivotally connected to the rearward edge 52 of the second platform 13 and are selectively operable to direct the thrust stream from the aft series 23 of engines downwardly to augment lift to the aircraft 10. In flight, the elevators 49 and 51 extend rearwardly coextensively with the second platform 13. Each elevator 49 and 51 is independently operable to provide yaw control to the aircraft 10 while in flight.

The aircraft 10 further includes a prow panel 53 pivotally connected to the forward edge 54 of the base 11 and disposed between the sides 14 and 16 of the aircraft 10. The panel 53 is cambered in cross-section and is adapted to lie flush with the upper surface 18 of the base 11 in normal flight. The panel 53 is operatively raised by hydraulic cylinders or the like to occlude a direct air flow to the forward engines 37 and 38 and forms an air reduction cavity defined by the panel 53, the two sides 14 and 16, the engines 37 and 38, and the upper surface 18 of the base 11. Thus the prow panel a serves to prevent air from flowing directly into the intake 39 of the engines 37 and 38 causing a semi-vacuum to form adjacent the panel 53 owing to the massive air induction of the engines 37 and 38. The resulting vacuum provides a greater lift coefficient to the prow of the aircraft 10 by reducing the pressure acting upon the upper surface 18 of the base 11. The cavity air reduction phenomenon thereby hastens the angle of attack of the aircraft 10, which angle, together with the depressed elevators 47, 48, 49 and 51, provides the aircraft 10 with A STOL capacity owing to all forward induction and thrust being inclined to the vertical.

Attached to the upper surface 22 of the second platform 12 adjacent the rearward edge 54 thereof are a pair of upright fins 57 and 58 (FIGS. 1–5) having rudders 59 and 61 pivotally connected thereto. The fins 57 and 58 serve to stabilize the horizontal movement of the aircraft 10 while the rudders 59 and 61 provide lateral control movement thereto.

To support the aircraft 10 on the ground 62, conventional landing gear 63, including wheels 64, is provided. The landing gear 63 is retractable into the vehicle to reduce the drag thereon during flight.

Figure 8:
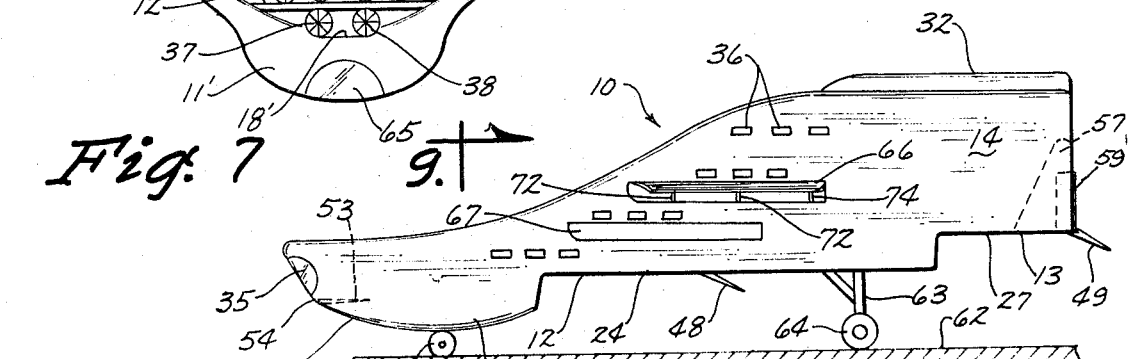
FIG. 8 is a side elevational view similar to FIG. 2 showing longitudinal elevators extended from the side of the craft.
Figure 9:
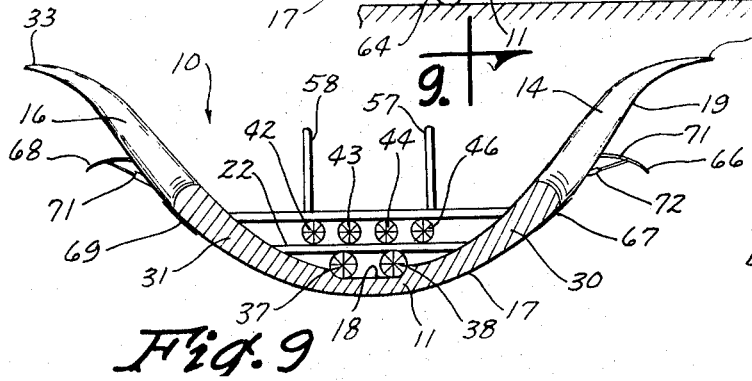
FIG. 9 is a cross-sectional view taken along the line 9—9 of FIG. 8.

To augment roll control and stability to the aircraft 10 (FIGS. 8 and 9), a plurality of elongated flaps 66, 67, 68 and 69 are provided. The flaps 66–69 are illustrated in conjunction with the twin fuselage aircraft 10 of this invention, however, it is contemplated that the flaps 66–69 are equally adaptable for use on the fuselage of conventional aircraft for the identical purpose.

The flaps 66–69 are identical and for purposes of brevity, only one flap 66 will be described. The flap 66 is concave in end view (FIG. 9) and conforms to the configuration of the side wall 19. The top edge 71 of the flap 66 is pivotally connected to the wall 19, with the pivotal axis thereof extending substantially parallel to the axis of the side 14. The flap 66 is pivotally extended from the side 14 by a plurality of power units 72, 73 and 74, such as hydraulic cylinders or the like, interconnecting the side 14 and the flap 66.

The concave configuration of the flaps 66–69 face downwardly when the flaps 66–69 are extended to oppose any deviating force causing the aircraft 10 to roll. Since the flaps 66–69 extend in a line substantially parallel to the direction of movement of the aircraft 10, the drag created thereon is minimal. The flaps 66–69 are retractable into the sides 14 and 16 during normal flight wherein the outer surface thereof becomes coextensive to the walls 19 and 21 of the sides 14 and 16 to provide a minimal drag, streamlined fuselage.

In operation, immediately prior to takeoff, the prow panel 53 is elevated to form the cavity, as hereinbefore described. The brakes of the landing gear 63 are applied and the engines 37, 38, 42–44 and 46 are powered, creating an air reduction in the cavity. The elevators 47, 48, 49 and 51 are lowered and the brakes are released, causing the aircraft 10 to roll down the runway. The reduction of air in the prow together with the aerodynamic forces acting upon the lower surface 17 of the base 11 cause the prow of the aircraft 10 to rise and assume the proper angle of attack. The downwardly directed thrust streams power the aircraft 10 upward. As the aircraft 10 is gaining altitude, the prow panel 53 is retracted flush with the upper surface 18 of the base 11 resulting in a direct flow of air into the engine intake 39.

When the aircraft 10 reaches its cruising altitude, the elevators 47, 48, 49 and 51 are pivoted to extend substantially parallel to or coextensively with the lower surfaces 24 and 37 respectively of the first and second platforms 12 and 13.

The air pressure acting upon the upper surfaces of the aircraft 10 is substantially eliminated by engine induction, since the induction exceeds contact flow for an appreciable distance forward of the engine intakes. The upper surface pressure can not accumulate since flight speed will suffice to provide the induction capture of such pressure prior to any substantial contact with the fore and aft engines. Thus, the decrease in pressure on the upper surfaces of the aircraft 10 serves to increase the lift coefficient thereon and this decrease in pressure coupled with the thrust flow buoyancy exerted on the lower surfaces 24 and 27 of the aircraft 10 enable the aircraft 10 to maintain the desired cruising altitude.

Upon landing the aircraft 10, the engines 37, 38, 42–44 and 46 power is reduced, causing the aircraft 10 to descend. If necessary, the prow panel 53 may be elevated partially to cause the prow to descend. Since the aircraft 11 remains buoyant upon the thrust stream, it is possible to obtain a greatly reduced landing speed without loosing control of the aircraft 10. Further, it is possible to completely elevate the prow panel 53 to raise the prow of the aircraft 10 and still remain buoyant upon the thrust stream at relative low speeds.

Figure 6:
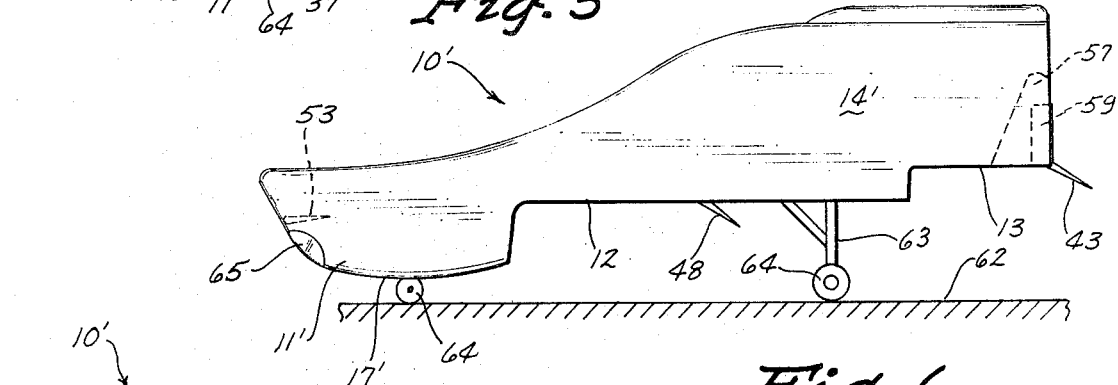
FIG. 6 is a side elevational view showing a modification of the aircraft of this invention.
Figure 7:
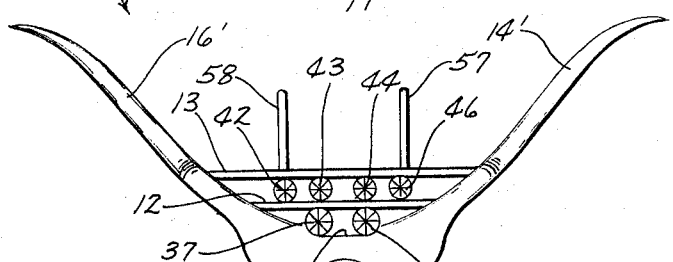
FIG. 7 is a front elevational view of the aircraft of FIG. 6.

Referring now to FIGS. 6 and 7, a modification having a single fuselage is illustrated with like numerals indicating like parts. The modified aircraft 10' includes a frame or vehicle defined by a modified base 11', a first platform 12, a second platform 13, each platform 12 and 13 arranged in stepped relationship relative to the base 11', and a pair of spaced apart sides 14' and 16' interconnecting the base 11' and platforms 12 and 13 and extending upwardly and outwardly therefrom. The aircraft 10' further includes a first series of engines 37 and 38 disposed between the base 11' and first platform 12, a second series of engines 42–44 and 46 disposed between the first and second platforms 12 and 13, a first series of elevators 47 and 48 connected to the first platform to direct the thrust stream of the first engines 37 and 38, and a second series of elevators 49 and 51 connected to the second platform 13 and operable to direct the thrust stream from the second engines 42–44 and 46. A prow panel 53 is also provided, together with vertical fins 57 and 58 and landing gear 63.

The modified base 11' is enlarged to serve as the fuselage for the modified aircraft 10' and generally includes a curved lower surface 17', including a forwardly mounted windshield 65, and a generally horizontally disposed upper surface 18'. Since the base 11' serves as the fuselage for the aircraft 10', the sides 14' and 16' may be of a narrow girth without affecting the aerodynamics or operation of the aircraft 10' and the engines 37, 38, 42–44 and 46 may be of lower power since the weight of the aircraft 10' together with the payload thereof will be substantially reduced.

A novel aircraft 10 has been described having a reduced drag by adopting the massive air induction characteristic inherent in modern jet engines to reduce the air pressure normally reacting with the upper surface of conventional aircraft. The jet stream from the engines provide the aircraft 10 with buoyancy and thereby enables the aircraft 10 to assume low speeds safely and remain buoyant.

In addition to better fuel consumption owing to the lower drag encountered by the aircraft 10, a twin fuselage arrangement enables greater economy by increasing the payload of the aircraft 10 while keeping the size of the aircraft 10 substantially the same as conventional aircraft. The cavity air reduction in the prow of the aircraft 10 provides STOL capacity hereto by enabling the aircraft 10 to assume a rapid and desired angle of attack. The provision of lateral flaps 66–69 increases the stability and roll control of the aircraft 10, while creating only a minimal drag thereon, owing to the configuration and placement of the flaps 66–69.

Although a preferred embodiment and a modification of the novel aircraft of this invention has hereinbefore been fully described, it is to be remembered that various alterations and modifications can be made thereto without departing from the invention as hereinafter defined.

I claim:

1. An aircraft comprising:

an elongated hull having a double wall, said hull being generally crescent in cross section, the central portion of the crescent being the bottom of the hull, the cross section of the hull departing somewhat from the shape of a crescent in that the upper edges of the aircraft are gradually curved outwardly toward a horizontal direction, the side view of the upper edges of said aircraft as defined by said outer ends of said crescent-shaped hull being gradually curved from the horizontal at the front of said aircraft upwardly toward the middle portion of said aircraft and then curving toward the horizontal again to provide a substantially horizontal fore-to-aft upper edge at the rear of said aircraft, the bottom of said aircraft being stepped in a plurality of levels from a lowest level in front to a highest level at the rear of said aircraft, the lowest level being gradually curved upwardly toward the front of said aircraft to form an airfoil, the bottom of said crescent cross section for each of said levels being modified to provide a horizontal platform that functions to provide lift, the adjacent ends of said platforms overlapping to form respective open horizontal fore-to-aft ducts therebetween, propulsion means mounted in each of said ducts to propel a fluid stream rearwardly over the lower surface of that one of said platforms forming the upper portion of the respective duct, an elevator means mounted in the exhaust stream of said propulsion means at the rear of at least one of said platforms, and a rudder means mounted to the aft portion of said aircraft.

2. An aircraft as claimed in claim 1 having a prow panel pivotally connected to the front edge of the fore one of said platforms, said panel being adapted to be rotated from a position adjacent to and in the plane of said fore platform to an upward position across the bottom surface of said crescent-shaped hull to obstruct the flow of air directly in a fore-to-aft direction over the front portion of said fore platform and to form a cavity above said platform communicating with the fore one of said ducts to direct the flow of air downwardly toward the upper surface of said fore platform and into said fore duct.

3. An aircraft as claimed in claim 1 wherein said elevator means includes a flap pivoted to the rear edge of at least one of said platforms, said flap being rotatable from a horizontal position to a downward and rearwardly slanting position.

4. An aircraft as claimed in claim 2 wherein said rudder means includes between the sides of said aircraft a fin mounted upright and longitudinally on the upper surface at the rear portion of the aft one of said platforms, and a vertical rudder pivotally mounted to the rear portion of said fin.

5. An aircraft as claimed in claim 2 having a stabilizing flap attached longitudinally to each of said upper edges of said crescent hull to extend the surfaces of the respective upper edge.

6. An aircraft as claimed in claim 2 wherein a roll flap is mounted in an opposite position on each side of said aircraft, each of said flaps being an elongated member mounted longitudinally to pivot about its upper edge from a position coextensive with the outer surface of its sides to a substantially outward horizontal position, the contour of said member being arcuate to conform with the contour of the outer wall of the side of said aircraft.

7. An aircraft as claimed in claim 2 wherein the fore central portion of said crescent-shaped hull is enlarged to enclose a cockpit.

8. An aircraft as claimed in claim 2 wherein spaces between the double walls on the sides of said aircraft are utilized for fuselages.

* * * * *